(12) United States Patent
Manders et al.

(10) Patent No.: US 8,220,616 B2
(45) Date of Patent: Jul. 17, 2012

(54) DEVICE AND METHOD FOR TRANSPORTING ELONGATE FOOD PRODUCTS

(75) Inventors: Wilhelmus Josephus Maria Manders, Boekel (NL); Patricius Petrus Marinus Johannes Maas, Son en Breugel (NL); Marcellinus Franciscus Ottow, Rosmalen (NL)

(73) Assignee: F.R. Drake Company, Waynesboro, VA (US)

( * ) Notice: Subject to any disclaimer, the term of this patent is extended or adjusted under 35 U.S.C. 154(b) by 627 days.

(21) Appl. No.: 11/917,408

(22) PCT Filed: Jun. 19, 2006

(86) PCT No.: PCT/NL2006/050140
§ 371 (c)(1),
(2), (4) Date: Jan. 14, 2008

(87) PCT Pub. No.: WO2007/032675
PCT Pub. Date: Mar. 22, 2007

(65) Prior Publication Data
US 2010/0133065 A1      Jun. 3, 2010

(30) Foreign Application Priority Data

Jul. 4, 2005   (NL) .................................... 1029421

(51) Int. Cl.
*B65G 47/26* (2006.01)
(52) U.S. Cl. .................. 198/459.5; 198/453; 198/463.5; 198/803.14
(58) Field of Classification Search .................. 198/453, 198/803.14, 836.4, 459.5, 463.5
See application file for complete search history.

(56) References Cited

U.S. PATENT DOCUMENTS

| 316,172 | A | * | 4/1885 | Potts ........................ 198/803.11 |
| 2,880,850 | A | * | 4/1959 | Keathley, Sr. et al. ... 198/803.11 |
| 2,941,655 | A | * | 6/1960 | Wells ............................ 198/408 |
| 2,955,696 | A | * | 10/1960 | Spooner ....................... 198/453 |
| 3,171,532 | A | | 8/1962 | Weller et al. |
| 3,240,312 | A | * | 3/1966 | Lovendusky ................. 198/443 |
| 3,340,996 | A | * | 9/1967 | Lucien Cerf ............ 198/803.11 |
| 3,469,671 | A | * | 9/1969 | Mencacci et al. .......... 198/418.2 |
| 3,480,132 | A | * | 11/1969 | Hideo ............................ 198/453 |
| 3,499,519 | A | * | 3/1970 | Toothman et al. ............ 198/434 |
| 3,511,355 | A | * | 5/1970 | Schlaupitz ................. 198/469.1 |
| 3,770,107 | A | * | 11/1973 | Michelbach .................. 198/633 |
| 3,789,802 | A | * | 2/1974 | Conley .......................... 119/337 |
| 4,077,524 | A | * | 3/1978 | Rysti .......................... 198/459.1 |
| 4,159,696 | A | * | 7/1979 | Martin .......................... 119/337 |
| 4,199,051 | A | * | 4/1980 | Kimberley .................... 198/448 |
| 4,677,283 | A | * | 6/1987 | Lewis ......................... 235/98 C |
| 5,632,594 | A | | 5/1997 | Missing |
| 5,768,996 | A | | 6/1998 | Ackley |
| 6,471,042 | B1 | * | 10/2002 | Van De Dungen et al. ... 198/703 |

(Continued)

FOREIGN PATENT DOCUMENTS

FR      2484968      12/1981

(Continued)

*Primary Examiner* — Joseph A Dillion, Jr.
(74) *Attorney, Agent, or Firm* — Berenato & White, LLC

(57) ABSTRACT

The present invention relates to a device for transporting elongate food products, comprising: a plurality of elongate product carriers, coupling means for parallel coupling of the product carriers and drive means for displacing the coupled product carriers over a transport path. The invention also relates to a method for displacing elongate food products over a transport path using elongate transport carriers.

19 Claims, 4 Drawing Sheets

U.S. PATENT DOCUMENTS

| | | | |
|---|---|---|---|
| 6,568,151 B2 * | 5/2003 | Buckley et al. | 53/240 |
| 7,222,719 B2 * | 5/2007 | Shackelford et al. | 198/459.2 |
| 7,311,513 B2 * | 12/2007 | Schwab et al. | 425/387.1 |
| 7,337,893 B2 * | 3/2008 | Charpentier | 198/454 |
| 8,127,916 B2 * | 3/2012 | Mix | 198/801 |

FOREIGN PATENT DOCUMENTS

| | | |
|---|---|---|
| FR | 2484968 | 12/1991 |
| GB | 994864 | 6/1965 |

\* cited by examiner

DEVICE AND METHOD FOR TRANSPORTING ELONGATE FOOD PRODUCTS

This is a Section 371 application of International Application PCT/NL2006/050140 filed Jun. 19, 2006, and claims priority of Netherlands application 1029421 filed Jul. 4, 2005.

BACK GROUND OF THE INVENTION

The present invention relates to a device for transporting elongate food products, comprising: a plurality of elongate product carriers, coupling means for parallel coupling of the product carriers and drive means for displacing the coupled product carriers over a transport path. The invention also relates to a method for displacing elongate food products over a transport path using elongate transport carriers.

Use is made of a variety of conveyors to transport elongate food products, and more particularly sausages. For controlled and positioned transport of such food products use is made of conveyors with compartments in which the products can lie only in an elongate form. A conveyor with upright partitions or elongate product carriers of a form-retaining material coupled in parallel for instance come to mind here. With such a conveyor randomly allocated food products can be carried out of a buffer such that they obtain a more controlled orientation for the purpose of undergoing a subsequent processing step. In order to prevent two or more elongate food products lying in undesired manner one on the other in a single product carrier, the dimensions of the product carriers must be adapted to the dimensions (in cross-section) of the elongate food products. It is thus possible to prevent two or more food products lying one on the other in a product carrier. If the opening of the individual product carriers also lies at a substantial angle relative to the horizontal and/or if the product carriers are too small to contain more than a single product, the supply of products can thus be precisely determined with the conveyor. The existing conveyors of the type stated in the preamble, which are also known under the name "collator", are however only suitable for processing elongate food products with dimensions lying within a determined range. In the case of sausages for instance, a range between 17 and 22 mm. Transport of thicker or thinner products which fall outside the specific range is impossible or requires modification of the existing transporting device, for instance by mounting other product carriers. Such a construction is time-consuming and expensive, so that in practice determined production lines for elongate food products are only applied for processing a limited range of products, or corrective (manual) labour is required.

The object of the present invention is to provide an improved device and method for transporting elongate food products with which elongate food products of very diverse dimensions can be transported without elaborate and/or costly operations.

BRIEF DESCRIPTION OF THE INVENTION

The present invention provides for this purpose a device for transporting elongate food products of the type stated in the preamble, wherein the device is also provided with a stationary product guide and the product carriers are provided with a passage for allowing passage of the stationary product guide into the product carriers, such that the effective volume of the product carriers over at least a part of the transport path is limited by a part of the stationary guide entering the product carriers. A stationary guide must be understood to mean a guide which takes up a fixed position relative to the transport path of the product carriers. Due to this definition of a stationary transport guide, a guide co-displacing over a part of the transport path can thus also fall within the definition of stationary guide provided such a co-displacing product guide continuously occupies the same guiding position over a determined guide path. An example of such a stationary guide is for instance a guide in the form of an endless conveyor belt, a part of which enters the transport carriers. The great advantage of the device according to the invention is that it is now possible to vary the effective volume of the product carriers without the individual product carriers (a large number of which is usually present in a single device) having to be modified, for instance by arranging "inserts". It is thus possible to convert the transporting device in very simple manner, and a much wider range of products, for instance within a range of 17-28 mm, can thus be processed without error using the present conveyor. An additional advantage is therefore that an optimal effective volume of the product carriers can readily be determined for every type (dimension) of elongate food product. Even within a range of products which could be processed with a traditional transporting device this provides the advantage that an optimal effective volume of the product carriers can now be set such that the chance of errors and/or damage to the products can be limited further. Another advantage is that other properties of the stationary product guide can also be adapted to the food products for processing. It is for instance possible here to envisage the form and the material properties of the contact surface of the stationary guide with the food products.

It is possible to embody the position of the product guide in adjustable manner relative to the product carriers. By adjusting or changing the position of the product guide it is possible to influence the degree to which and the position(s) of the transport path at which the product guide enters the product carriers with only a single product guide. It is also possible to give the product guide an exchangeable form. An exchangeable product guide makes it possible to replace a specific guide with a different product guide such that the effective guide path can vary. Depending on conditions it is herein also readily possible to alter other properties of the guide, such as the form or the properties of the contact surface of the product guide.

Coupling means can be provided which connect the product carriers into an endless chain, although the product carriers can also engage directly on each other or have a common flexible base.

The passages of the product carriers can advantageously be formed by slotted recesses lying perpendicularly of the length of the product carriers. A product carrier can be provided with a single passage, but it is also possible for the individual product carriers to be provided with a plurality of mutually parallel passages. In the case of a plurality of passages in a single product carrier, it is also desirable that the device is also provided with a plurality of mutually parallel stationary guides. The plurality of mutually parallel passage openings makes it possible to have a plurality of product guides protrude into a single product carrier, such that the effective volume can be effectively influenced over a greater length of a product carrier. This makes it for instance possible to receive a plurality of individual elongate products, such as for instance sausages, in a single product carrier, and also to separately influence the effective volume of the product carrier for this plurality of individual products. The stationary guide can be assembled with a frame, which frame also supports the drive means, and a conveyor belt for guiding the coupled product carriers.

In yet another advantageous embodiment variant it is possible for the cross-section through a product carrier to be provided with a feed opening having two first wall parts situated on opposite sides of the feed opening and running substantially parallel to each other, to which first wall parts connect two second wall parts on the sides remote from the feed opening, these second wall parts lying at an angle relative to the first wall parts such that they are directed toward each other. It is herein possible that a first wall part transposes with a curve into a second wall part. Such a design of the product carriers, wherein the closed side of the product carrier has a V-shape, has the advantage that there is little "empty" space in a product carrier when it is filled with an elongate food product. Another advantage of such a design of the product carrier is that the food products will take up a relatively stable position therein, which prevents undesired displacement of products in the product carrier. In order to prevent products falling out of the product carrier on the underside and to give the product carrier sufficient strength, it is desirable that the second wall parts connect to each other on the side remote from the first wall parts. Conversely, it is also possible to leave a narrow passage clear between the second wall parts; undesired material can thus be discharged from a product carrier and the product carrier is easy to clean. A simplified cleaning of a product carrier can however also be achieved when the second wall parts connect to each other via a curve. It is desirable that at least the second wall parts are provided with a passage to allow passage of the stationary product guide.

The present invention also provides a method for displacing elongate food products over a transport path using elongate product carriers, wherein the effective volume of the product carriers is adjusted by positioning a stationary product guide relative to the transport path, which stationary product guide enters the product carriers by means of passages arranged for this purpose in the transport carriers. With such a method the advantages can be achieved as already described above with reference to the device according to the present invention.

The adjustment of the stationary guide, and thereby the effective volume of the transport carriers, can be realized by means of fixing the stationary guide in a desired position. As alternative (or in combination with the measure described in the previous sentence), it is however also possible to obtain the adjustment of the stationary guide by means of exchanging the stationary guide for a specifically formed stationary guide.

BRIEF DESCRIPTION OF THE DRAWINGS

The present invention will be further elucidated on the basis of the non-limitative exemplary embodiments shown in the following figures. Herein.

DETAILED DESCRIPTION OF THE PREFERRED EMBODIMENT

Figure 1:
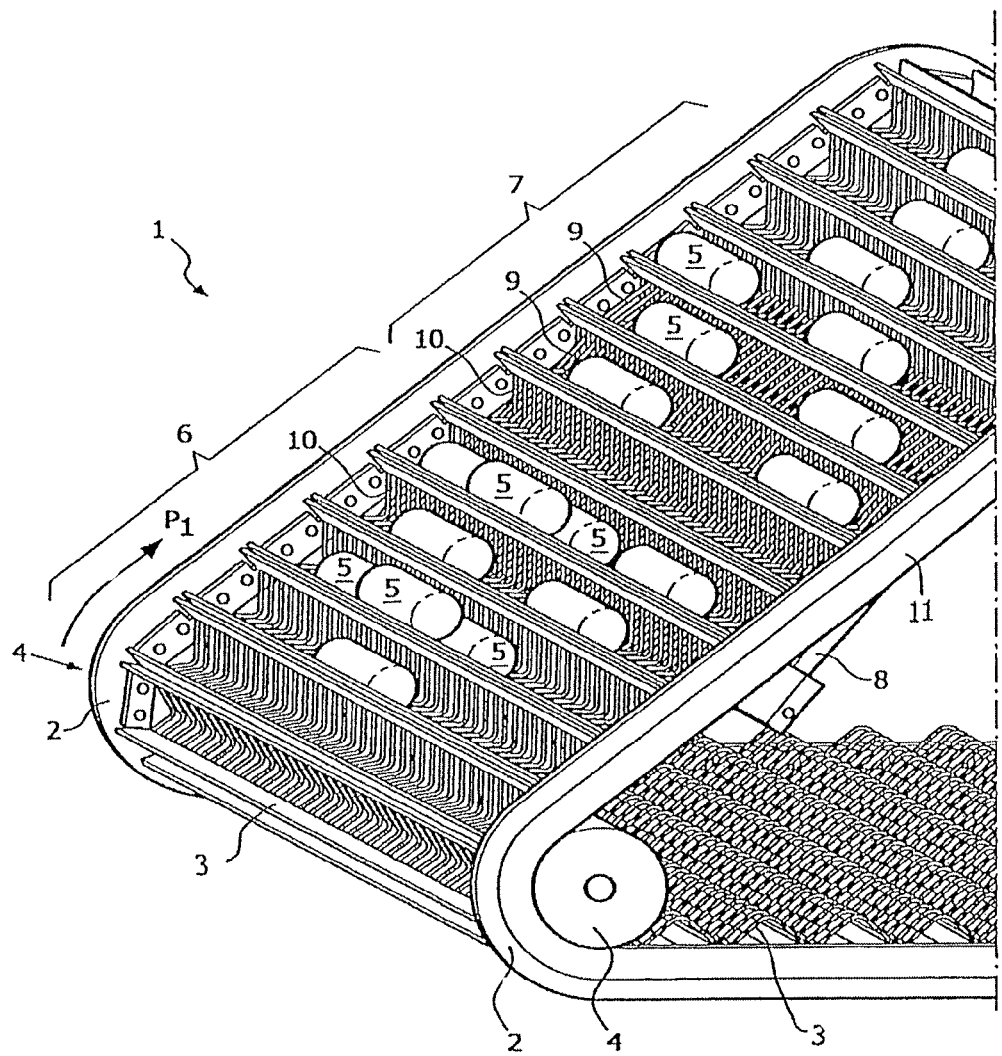
FIG. 1 shows a perspective view of a conveyor according to the present invention.

FIG. 1 shows a part of a conveyor 1 with two displaceable carriers 2, between which are placed elongate product carriers 3. The displaceable carriers 2 are moved along a transport path, forming an endless loop, in a direction as according to arrow $P_1$ by wheel pairs 4, only one of which is shown in this figure. The product carriers 3 are adapted to contain elongate food products such as sausages 5 shown in this figure. In a lower part 6 of an ascending part of the transport path two sausages 5 can locally lie one on top of another in a single product carrier 3. In a subsequent part 7 of the ascending part of the transport path connecting to the lower part 6 of the ascending part of the transport path there are however arranged provisions which prevent two sausages 5 from still lying one on top of the other in a product carrier 3. These measures comprise, among other things, a stationary product guide 8 including one or more guide elements 9. The stationary product guide is disposed adjacent to the ascending part of the endless transport path so that the guide elements 9 enter through one or more passages in each of the product carriers 3. The passages (also referred to herein as guide openings) in each of the product carriers 3 is formed by slots (or slotted recesses) 10 arranged for this purpose in the product carriers 3 perpendicularly of the length thereof such that the effective volume (the volume available for holding the sausages 5) of the interior compartments of the product carriers is smaller during the subsequent part 7 of the ascending part of the transport path than the effective volume of the interior compartments of the product carriers 3 when they are situated at the position of lower part 6 of the ascending part of the transport path. The stationary product guide 8 is assembled with a frame 11, which also supports the drive means and the displaceable carriers 2 for guiding the coupled product carriers 3.

Figure 2A:
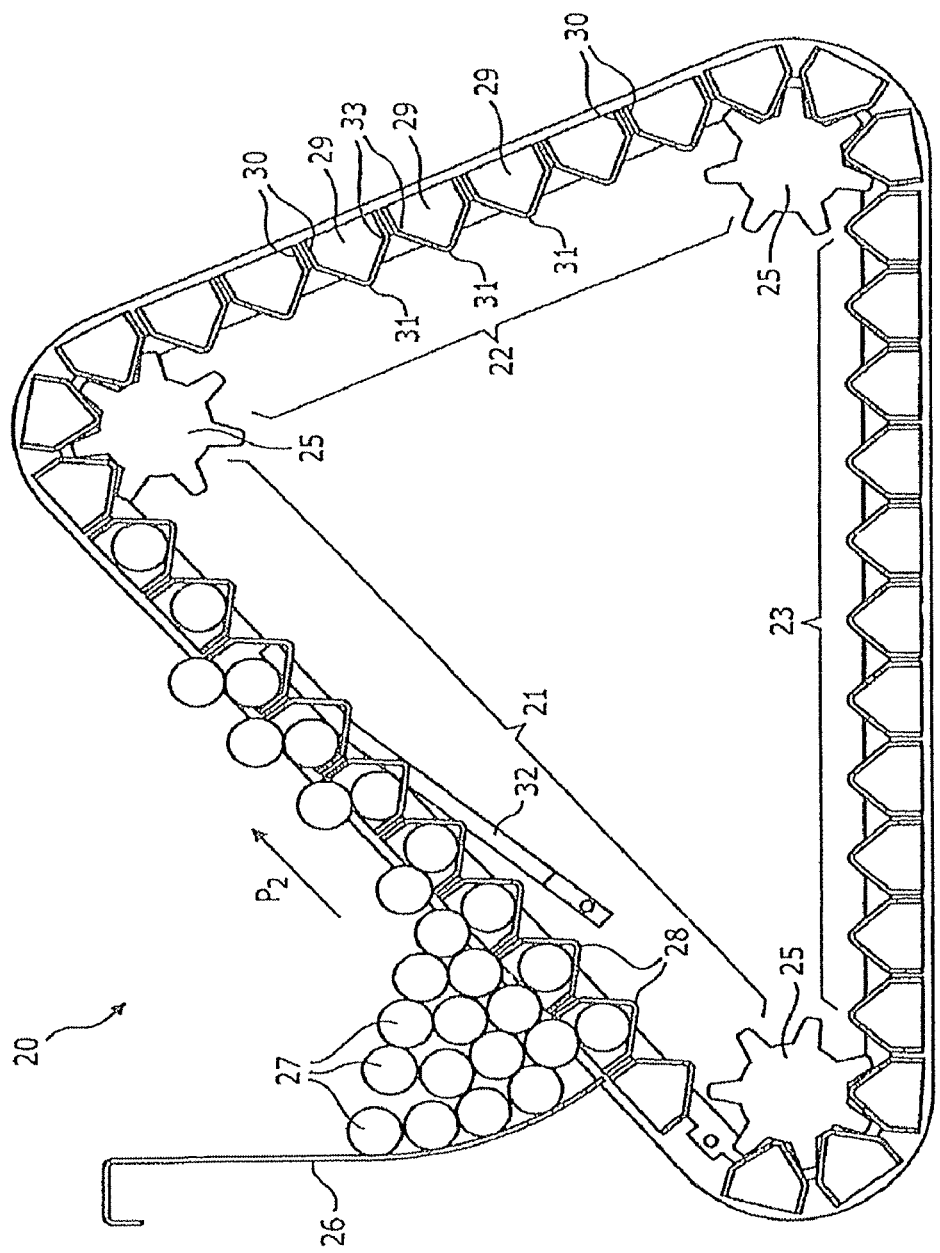
FIG. 2A shows a cross-section of an alternative embodiment variant of a conveyor according to the present invention.

FIG. 2A shows a cross-section through a conveyor 20 of a similar type as shown in FIG. 1. Conveyor 20 has an ascending part 21, a descending part 22 and a return part 23. The configuration of conveyor 20 is partly determined by a number of guide wheels 25, at least one of which is preferably driven. On the lower side of ascending part 21 the conveyor 20 connects to a supply container 26 in which a larger quantity of sausages 27 is buffered. Some of the sausages 27 are carried along in direction $P_2$ by product carriers 28.

It is noted that the cross-section through product carriers 28 shows that also the form of these product carriers is per se already an invention. A product carrier 28 is provided with a feed opening 29 to which two parallel first wall parts 30 connect. On the side of the parallel first wall parts 30 remote from feed opening 29 these wall parts transpose into respectively two mutually connecting second wall parts 31. As shown in FIG. 2A, each of the first wall parts 30 transposes with a curve 33 into the second wall part 31. The thus defined design of product carriers 28 results in a number of significant advantages relative to the more traditionally designed product carriers. Such an advantage is for instance the simplified accommodation of sausages 27 in product carriers 28 with great positional accuracy. A further advantage of the thus formed product carriers 28 is that they can be provided relatively easily with openings (not visible in this figure but comparable to slots 10 as shown in FIG. 1), whereby a guide 32 in stationary position can enter the interior (the "effective volume") of the product carriers 28.

During the first part of ascending part 21 a product carrier may still contain a plurality of sausages 27 lying one on top of another, but as a result of the reduction in the effective volume of product carriers 28 by stationary guide 32, the upper sausage 27 of two sausages 27 lying one on top of the other is pushed out of product carrier 28 such that an upper sausage 27 will roll downward. There is therefore a guarantee that, when a product carrier 28 reaches the top of ascending part 21, it will not contain any stacked sausages 27. Depending on the dimensions (particularly the diameter) of sausages 27 for displacing, the position of the stationary guide can be positioned (adjusted) optimally; i.e. in the case of smaller sausages running to a higher position than in the case of sausages 27 with a larger diameter. Smaller sausages 28 do after all require a smaller effective volume of a product carrier 28 than a larger sausage 28.

Figure 2B:
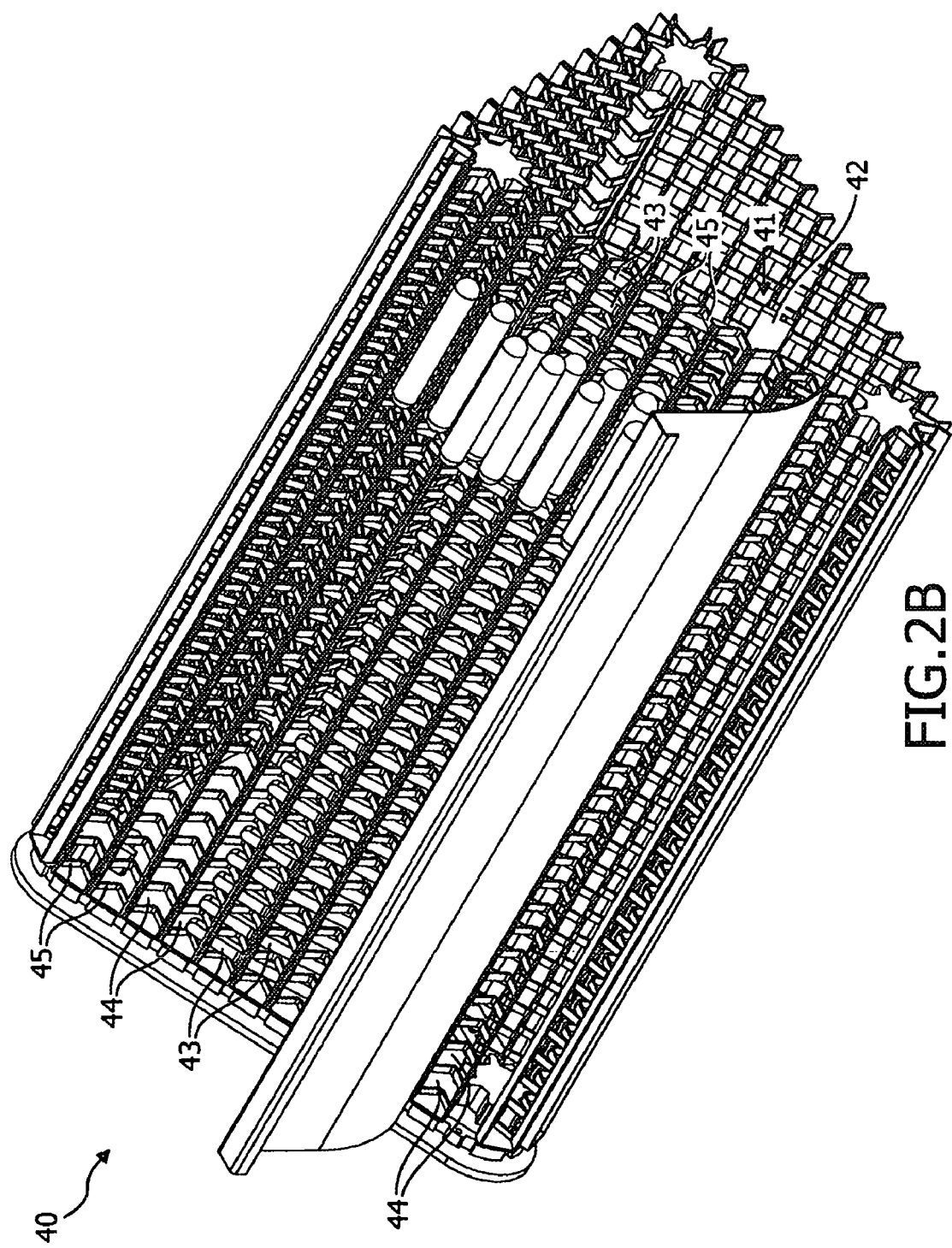
FIG. 2B shows a cut-away perspective view of the conveyor of the type as shown in FIG. 2A.

FIG. 2B shows a cut-away view of a part of a conveyor 40 of the type shown in FIG. 2A. It can be seen in this figure that a guide 41 in stationary position has a comb-like construction with a central connecting part 42 and a plurality of parallel teeth 43 extending therefrom. Teeth 43 are dimensioned such that they can be placed through slotted openings 44 in product carriers 45 and can then be locked in a specific desired position. For the further operation of conveyor 40 reference is made to the description of conveyor 20 as described with reference to FIG. 2A.

Figure 3:
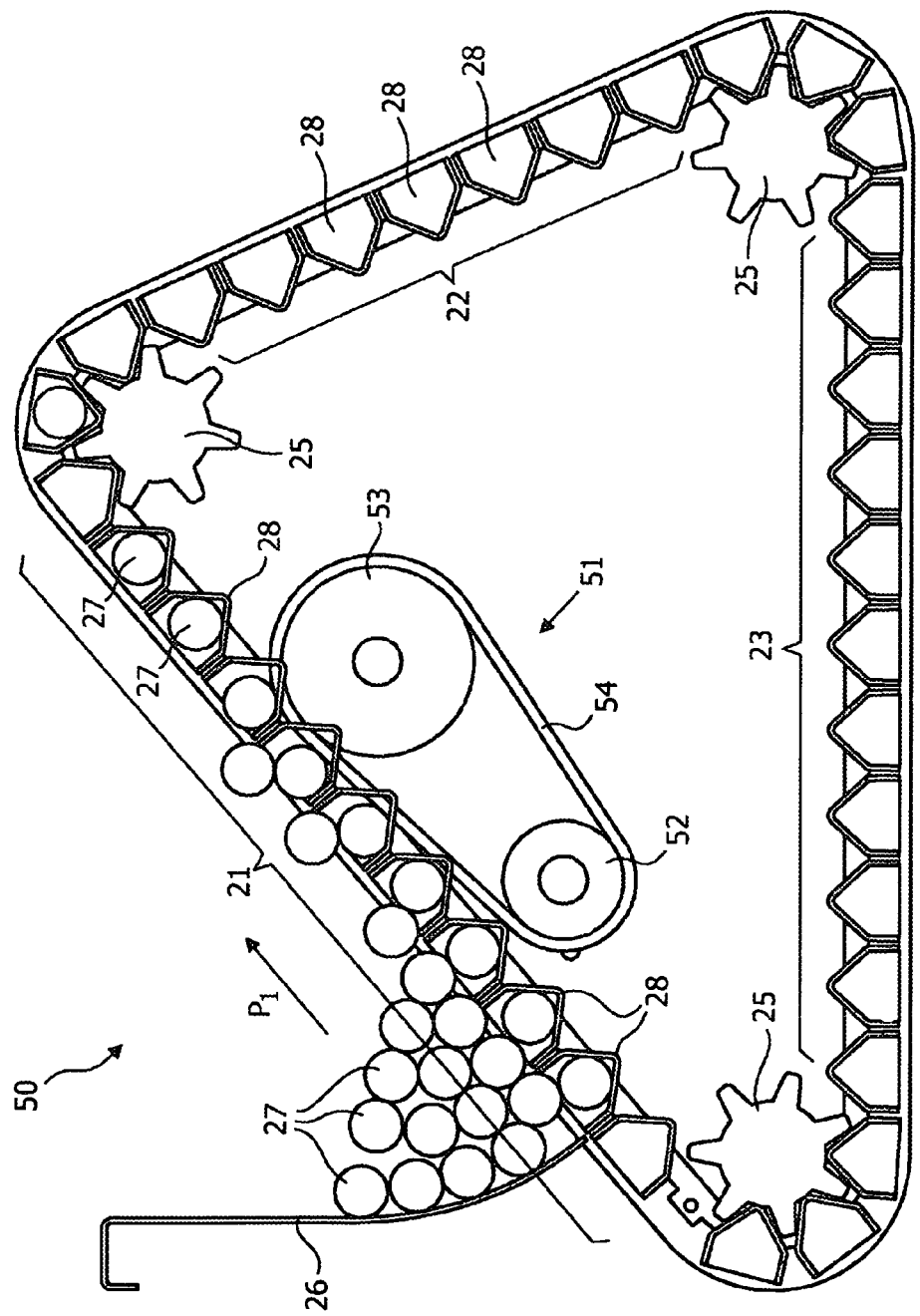
FIG. 3 shows a cross-section of a second alternative embodiment variant of a conveyor according to the present invention.

FIG. 3 shows a view of a cross-section through an alternative embodiment variant of a conveyor 50, wherein attention will be given only to the differences relative to conveyor 20 shown in figure 2A. The corresponding components are designated with identical reference numerals. Conveyor 50 is provided with a stationary guide 51 which is formed by two rollers 52, 53 with which belts 54 arranged around these rollers 52, 53 can be moved. The upper part of belts 54 can thus be co-displaced as desired with product carriers 28 in the ascending part 21 in the direction of transport $P_1$, whereby little friction (or even none at all) will occur between a sausage 27 lying in a product carrier 28 and the belts 54. Although the name "stationary guide" 51 perhaps creates the impression that this guide does not move, this is not necessarily the case; stationary guide 51 is situated at a fixed (stationary) support position, though it is possible that this stationary guide is in motion at a fixed position. Conversely, it is also possible to envisage the upper part of stationary guide 51 moving in a direction opposite to the direction of transport $P_1$ of product carriers 28 in ascending part 21.

What is claimed is:

1. A device for transporting elongate food products, comprising:
   a plurality of elongate food product carriers coupled to and parallel with respect to one another, each of the food product carriers comprising an interior compartment having an effective volume, a feed opening associated with the interior compartment, and a guide opening, the feed openings of the food product carriers being configured to receive elongate food products into the interior compartments of the food product carriers;
   a drive operatively engaged to the plurality of food product carriers to displace the food product carriers along a transport path forming an endless loop, the transport path having an ascending part, a descending part and a return part; and
   a product guide comprising a guide element,
   wherein the food product carriers and the product guide are constructed and arranged with respect to one another such that displacement of the elongate food product carriers along the ascending part of the transport path by the drive causes the guide element to enter and exit through the guide openings but not the feed openings of the food product carriers to temporarily reduce the effective volume of the interior compartments of the food product carriers to a reduced volume sufficient to retain a single row of the elongate food products in each of the food product carriers yet insufficient to deliver more than the single row of food articles per each of the elongate food product carriers to a top of the ascending part.

2. The device as claimed in claim 1, wherein the position of the product guide is adjustable relative to the food product carriers.

3. The device as claimed in claim 1 wherein the product guide is exchangeable.

4. The device as claimed in claim 1, further comprising a coupling device connecting the food product carriers into an endless chain.

5. The device as claimed in claim 1, wherein the guide openings comprise slots extending perpendicularly to the length of the food product carriers.

6. The device as claimed in claim 1, wherein each of the food product carriers is provided with a plurality of parallel guide openings.

7. The device as claimed in claim 6, wherein the guide element is a first guide element, and wherein the product guide further comprises a second guide element parallel to the first guide element.

8. The device as claimed in claim 1, further comprising a frame supporting the drive, wherein the guide element comprises a conveyor belt.

9. The device as claimed in claim 1, wherein each of the food product carriers comprises two first wall parts situated on opposite sides of the feed opening and running substantially parallel to each other to define the feed opening, and two second wall parts connected to the first wall parts respectively, the second wall parts extending at an angle relative to the first wall parts such that the second wall parts extend toward each other.

10. A device for transporting elongate food products, comprising:
   a plurality of elongate food product carriers coupled to and parallel with respect to one another, each of the food product carriers comprising a pair of first wall portions, a pair of second wall portions respectively connected to the first wall portions, an interior compartment having an effective volume, a feed opening, and a guide opening, the feed openings of the food product carriers being configured to receive elongate food products into the interior compartments of the food product carriers;
   a drive operatively engaged to the plurality of food product carriers to displace the food product carriers along a transport path forming an endless loop, the transport path having an ascending part, a descending part and a return part; and
   a stationary product guide disposed in a fixed position relative to the transport path adjacent to the ascending part thereof, the stationary product guide comprising a guide element,
   wherein the food product carriers and the stationary product guide are constructed and arranged with respect to one another such that displacement of the elongate food product carriers along the ascending part of the transport path by the drive causes the guide element to enter and exit through the guide openings but not the feed openings of the food product carriers to temporarily reduce the effective volume of the interior compartments of the food product carriers to a reduced volume sufficient to retain a single row of the elongate food products in each of the food product carriers yet insufficient to deliver more than the single row of food articles to a top of the ascending part.

11. The device as claimed in claim 10, wherein each of the food product carriers further comprises a curved wall part connecting the second wall parts to one another.

12. The device as claimed in claim 1, wherein the product guide comprises a first roller and a second roller and the guide element comprises a belt carried by the first and second rollers.

13. The device as claimed in claim 1, wherein the guide element comprises a plurality of teeth.

14. The device as claimed in claim 10, wherein the guide openings comprise slots extending perpendicularly to the length of the food product carriers.

15. The device as claimed in claim 14, wherein the guide element comprises a plurality of teeth.

16. The device as claimed in claim 15, wherein each tooth of the guide element passes into a respective individual slot of the food product carrier.

17. The device as claimed in claim 10, wherein the product guide comprises a first roller and a second roller and the guide element comprises a belt carried by the first and second rollers.

18. The device as claimed in claim 10, wherein the position of the product guide is adjustable relative to the food product carriers.

19. The device as claim in claim 10, further comprising a coupling device connecting the food product carriers into an endless chain.

* * * * *

UNITED STATES PATENT AND TRADEMARK OFFICE
CERTIFICATE OF CORRECTION

PATENT NO. : 8,220,616 B2
APPLICATION NO. : 11/917408
DATED : July 17, 2012
INVENTOR(S) : Manders et al.

Page 1 of 1

It is certified that error appears in the above-identified patent and that said Letters Patent is hereby corrected as shown below:

In the Claims:

Claim 1, column 6, line 1, change "food articles" to read --elongate food products--.

Claim 10, column 6, line 66, change "food articles" to read --elongate food products--.

Signed and Sealed this
Twentieth Day of August, 2013

Teresa Stanek Rea
*Acting Director of the United States Patent and Trademark Office*